Oct. 22, 1963  S. J. ERST  3,108,273
CONTINUOUS WAVE NARROW RECOGNITION ZONE RADAR SYSTEM
Filed March 31, 1958  3 Sheets-Sheet 1

Inventor:
Stephen J. Erst,
by Gust & Irish
Attorneys.

Oct. 22, 1963 S. J. ERST 3,108,273
CONTINUOUS WAVE NARROW RECOGNITION ZONE RADAR SYSTEM
Filed March 31, 1958 3 Sheets-Sheet 3

Inventor:
Stephen J. Erst,
by Gust & Irish
Attorneys.

ved Oct. 22, 1963

United States Patent Office
3,108,273
CONTINUOUS WAVE NARROW RECOGNITION ZONE RADAR SYSTEM
Stephen J. Erst, New Haven, Ind., assignor to International Telephone & Telegraph Corporation
Filed Mar. 31, 1958, Ser. No. 725,432
25 Claims. (Cl. 343—14)

This invention relates to radar systems, and more particularly to a radar system employing continuous wave transmission and providing an extremely narrow, selectively positionable zone of recognition.

Conventional radar systems provide range information, i.e., the location of a distant object, throughout substantially the entire range of the apparatus. In such conventional radar systems, a transmitted signal is reflected from a distant object and received by a local receiver, the transmitted signal generally initiating a sweep on a cathode ray viewing tube with the received signal being displayed on the tube, thus providing continuous indication of the range of the distant object. Such conventional radar systems have employed pulse techniques, i.e., the transmission of short high-frequency pulses and thus, in order to provide range information at close distances, extremely short pulse widths are required. In addition, as indicated, conventional radar apparatus provides a signal return from all targets within the range of the transmitted signal. Furthermore, such conventional pulsed radar apparatus requires complex and expensive components.

There are applications for radar systems in which it is desired to provide an output signal when the distant object is at a given range from the transmitting equipment, and at no other time, and it may further be desired that such an output signal be provided when an object is at an extremely close range from the transmitting apparatus; such systems may be conveniently referred to as "range-limited." It may also be found desirable that such a range-limited radar system provide an indication of the presence of a distant object within an extremely narrow zone at a considerable distance from the transmitting apparatus, with no signal being provided by objects outside of such recognition zone. It may also be desirable that this narrow zone of recognition be selectively positionable toward and away from the transmitting apparatus. It is also desirable that such a radar system employ continuous wave transmission rather than pulse techniques in order that target discrimination at extremely short ranges may be realized.

I have discovered that a continuous wave radar system providing an extremely narrow selectively positionable zone of recognition can be provided by transmitting a signal which is frequency modulated with a sawtooth waveform signal, comparing the received signal reflected from the distant object with a signal responsive to the transmitted signal, and filtering the signal resulting from the comparison to pass the Doppler frequency band contained therein.

It is accordingly an object of this invention to provide an improved radar system.

Another object of my invention is to provide an improved radar system having an extremely narrow zone of target recognition.

A further object of my invention is to provide an improved continuous wave radar system.

A still further object of my invention is to provide an improved continuous wave radar system providing an extremely narrow selectively positionable zone of target recognition.

The above-mentioned and other features and objects of this invention and the manner of attaining them will become more apparent and the invention itself will be best understood by reference to the following description of an embodiment of the invention taken in conjunction with the accompanying drawings, wherein.

It is generally known that when more than one modulation frequency is present in a frequency modulation signal, side-bands are caused by all of the sum and difference frequencies between the harmonics as well as the harmonics themselves. If then a sinusoidal signal is frequency modulated by a substantially symmetrical sawtooth waveform signal, and the resulting signal is transmitted, the transmitted signal may be expressed in the following form:

(1)  $$e_T = K \cos \theta$$

where $$\theta = \left( wt + B \sin \mu t + \frac{B}{2} \sin 2\mu t + \frac{B}{3} \sin 3\mu t + \cdots \frac{B}{n} \sin n\mu t + \delta \right)$$

and where $K =$ a constant representing the sum of gains and losses, such as attenuation, target reflectivity, and propagation losses, etc.

$$B = \frac{\Delta f \text{ (deviation)}}{f_m \text{ (modulation frequency)}} = \text{modulation index}$$

$\mu = 2\pi f_m$
$w = 2\pi f_c$ (carrier frequency)

If then the transmitted signal (1) is reflected from the distant object and received by a receiver, the received signal may be expressed as follows:

(2)  $$e_r = K' \cos \phi$$

where $$\phi = \left[ w(t-T) + B \sin \mu(t-T) + \frac{B}{2} \sin 2\mu(t-T) + \cdots \frac{B}{n} \sin n\mu(t-T) + \delta \right]$$

$$T = \frac{2D \text{ (distance to target)}}{C \text{ (velocity of propagation)}}$$

If now the received signal (2) is compared or mixed with a portion of the transmitted signal, or a signal responsive thereto, and the compared signal detected, the resulting signal may be expressed as follows:

(3)  $$vd = K'' \sin \Delta$$

where $\Delta = \theta - \phi =$ phase difference of transmitted and received signals The above expression can be expanded in Bessel notation to yield a multiplicity of terms and examination of these terms will indicate one having the following form:

$$(4) \quad vd = K''[J_0(M_1)J_0(M_2)J_0(M_3) \ldots J_0(M_n)] \cdot \left[\cos \frac{wD}{C}\right]$$

where $J_0(M_n) = $ A Bessel function of order 0 and argument $M_n$ $$M_n = 2\frac{B}{n^2} \sin n\frac{\mu D}{C}$$

$\cos \frac{wD}{C} = $ Doppler frequency band

It is now seen that the above Equation 4 representing the selected mixed signal $vd$ can be seen to consist of multiple products of $J_0$ and arguments $M_n$ further multiplied by the Doppler frequency term.

Figure 1:
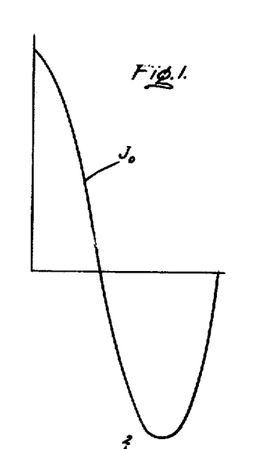
FIG. 1 is a diagram showing the configuration of the $J_0$ Bessel function useful in explaining my invention.

Referring now to FIG. 1, there is shown a plot of the first swing of the $J_0$ function; it will be understood that the $J_0$ function will continue to swing positively and negatively with decreasing amplitude for increasing arguments and will subsequently mirror when the argument is decreased. Since the $J_0$ term appearing in Equation 4 has no frequency component, being merely an amplitude term, it will be seen that if the mixed signal is filtered to pass the Doppler frequency band $$\left(\cos \frac{wD}{C}\right)$$

the resulting signal will have a range response characteristic corresponding to the $J_0$ configuration. It will be readily seen that there must be excluded from the expected Doppler frequency band any and all frequencies resulting from the modulation frequency as a result of the multiple modulation process. Thus, it will be seen that the modulation frequency must be higher than the expected Doppler frequency band. Assuming momentarily a Doppler frequency region from 5 to 150 kc. as being acceptable, the lowest practical modulating frequency, allowing a 50 kc. margin of separation, would then be 200 kc.; it will be seen that all other modulation frequencies will be separated from one another by 200 kc. and thus the modulating signal is defined as 200 kc. and its harmonics. An examination of Equation 4 serves to indicate that the magnitude of $vd$ could be made large where $M_1 = M_2 \ldots = M_n = 0$ at $D = 0$, and that $vd$ could be made equal to 0 provided that $$M_1 = M_2 \ldots = M_n = 2.4$$

To accomplish these relations, one can solve for the required frequency in the definition of $M_n$ accompanying Equation 4.

It will now be seen that the $J_0$ characteristic shown in FIG. 1 can be made extremely sharp, i.e., narrow in terms of D, since:

$$(5) \quad 0 = J_0\left(2B \sin \frac{\mu D}{C}\right) \text{ when } 2B \sin \frac{\mu D}{C} = 2.4$$

Since in the above Equation 5, the desired range D along with the velocity of propagation C is known, it is merely necessary to select the term B. It will be recalled that the modulation frequency $f_m$ must be above the expected Doppler band and it will further be understood that both a low carrier frequency and a low modulating frequency with a high index of modulation are desired since the modulation index has to be high in order to obtain as many terms as possible in the mixed signal.

The above conditions occur only over the linear portion of the sine function, and coherence diminishes as the value of $n$ increases. The expression for the detected signal can thus be represented by the following approximation of Equation 4 with all of the M terms equal:

$$(6) \quad vd \simeq bJ_0(M)^x \cos \frac{wD}{C}$$

where $x = $ the number of effective terms
$b = $ the gains and losses in the system It is thus seen that since, in a frequency modulated system, there is a limit of deviation $(\Delta f)$, as the modulating frequency $f_m$ is increased, the modulation index B is decreased (recalling that in this system, the modulation frequency must be above the expected range of the Doppler frequency). Thus, a low modulation index results in a poor range cut-off since the number of terms contained in the expression for the mixed signal is also low and it is therefore advantageous to employ the lowest practical carrier and modulation frequencies in order to obtain the highest possible modulation index.

Figure 2:
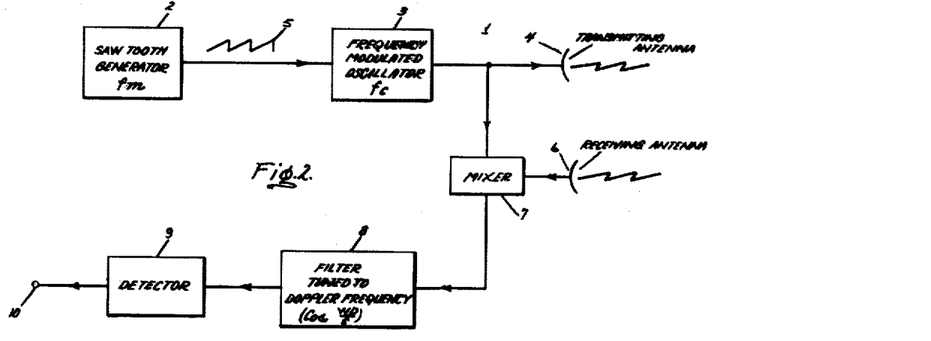
FIG. 2 is a schematic block diagram showing one embodiment of my invention.

Referring now to FIG. 2, my improved continuous wave radar system, generally identified as 1, includes a sawtooth signal generator 2, of any conventional type, coupled to frequency modulated oscillator 3, again of any conventional type, which in turn is coupled, through any necessary amplifying stages, to transmitting antenna 4. Transmitting antenna 4 therefore transmits a signal frequency modulated by the sawtooth waveform signal 5, generated by the sawtooth generator 2. Receiving antenna 6 is arranged to receive signals reflected from a distant object, and is coupled to a conventional mixer circuit 7. Mixer circuit 7 is also coupled to the output of the frequency modulated oscillator 3 so that a portion of the transmitted signal is mixed with the received signal from the antenna 6. The output circuit of the mixer 7 is coupled to filter circuit 8 which is tuned to pass the expected Doppler frequency band $$\left(\cos \frac{wD}{C}\right)$$

Filter 8 is in turn coupled to conventional detector means 9 which in turn is connected to any desired utilization circuit by output terminal 10.

Figure 3:
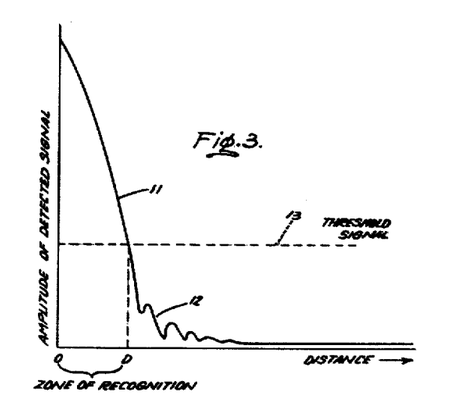
FIG. 3 is a plot of the range response characteristic of the system of FIG. 2.

Referring now to FIG. 3, there is shown a plot of the range response characteristic of the signal provided by the detector 9 of the system 1 and it will be seen that the major portion 11 of this plot corresponds essentially to the $J_0$ characteristic of FIG. 1; the series of decreasing amplitude peaks 12 at the end of the major peak 11 are caused by the lack of coherence in the non-linear portions of the sin function of the output of the mixer 7. It will be readily understood that it will in all probability be found necessary to incorporate some gain in the circuit of the filter 8 and detector 9 and thus that one or more stages of amplification may be necessary, as is well known in the art. It will now be seen that if the utilization apparatus to which the output circuit 10 of the detector 9 is connected will respond to an output signal having an amplitude higher than that shown by the dashed line 13 in FIG. 3, referred to as the threshold signal, a usable output signal will be provided at any time when the distant object from which the received signal is reflected is within distance D from the transmitting antenna 4. It will now be observed that the zone of recognition of the system 1 is from 0 to D distance and it will be recalled from the discussion heretofore that the sharpness of the peak 11, corresponding to the $J_0$ characteristic, can be predetermined by the appropriate selection of the modulation index.

It may be desirable to move the zone of recognition outwardly from the transmitting apparatus so that a target will provide a visible output signal from the detector 9 when it appears within the narrow recognition zone, the zone being spaced from the transmitting apparatus by a suitable distance in contrast with the system of FIG. 1 in which the recognition zone begins at the transmitting apparatus and extends outwardly therefrom to distance D.

Figure 4:
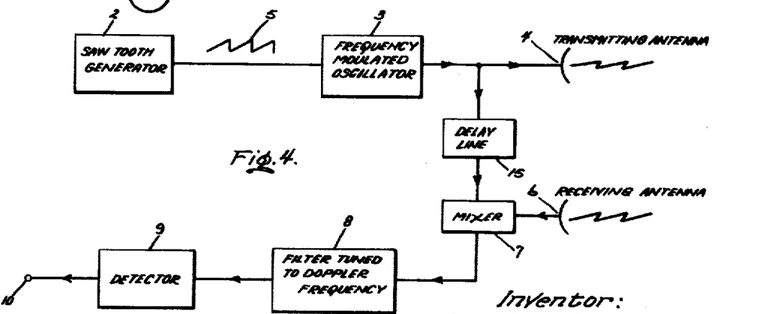
FIG. 4 is a schematic block diagram showing the preferred embodiment of my invention.
Figures 6, 7:
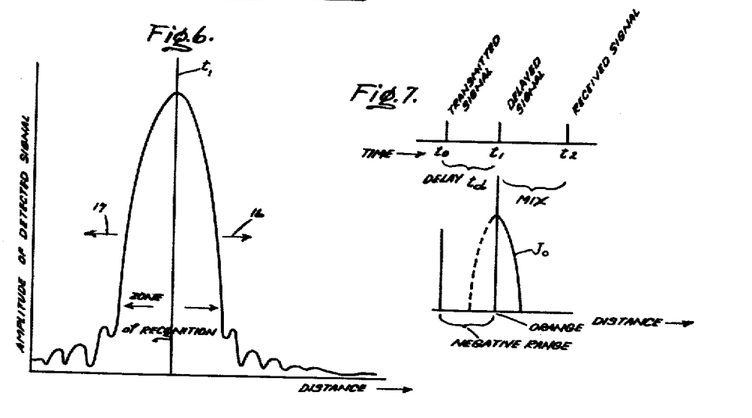
FIG. 6 is a plot showing the range response characteristic of the systems of FIGS. 4 and 5.
FIG. 7 is a diagram useful in explaining the mode of operation of the systems of FIGS. 4 and 5.

Referring now to FIG. 4 in which like elements are indicated by like reference numerals, this objective is provided by adding a delay line 15 between the transmitting antenna 4 and the mixer 7. Referring to FIG. 7 in addition to FIGS. 4 and 6, the delay line 15 introduces a delay $t_d$ in the portion of the transmitted signal fed to the mixer 7. It is thus seen that the transmitted signal is initiated at time $t_0$ whereas the delayed signal $t_1$ is fed to the mixer 7 at a time $t_d$ thereafter. The received signal $t_2$ is therefore mixed by the mixer 7 with the delayed signal $t_1$, which is identical to and responsive to the transmitted signal, this having the effect of moving the 0 range outwardly by a distance equivalent to the delay time $t_d$ of the delay line 15. The delay time $t_d$ therefore in effect constitutes a negative range with the $J_0$ characteristic occupying this negative range, as shown in dashed lines in FIG. 7. It is thus seen that delaying the sawtooth waveform modulated signal fed to the mixer 7 by time $t_d$ has the effect of moving the $J_0$ characteristic outwardly by a distance corresponding to the delay time $t_d$. The plot of FIG. 6 shows the actual range response characteristic obtained with the system of 15 and it will again be understood that the width of the zone of recognition is again predetermined in the manner described above.

In a system in accordance with FIG. 4 for providing a zone of recognition of ten (10) yards with its midpoint spaced five (5) yards from the transmitting apparatus, sawtooth generator 2 may provide a sawtooth waveform signal 5 of 200 kc., frequency modulator oscillator 3 may have a carrier frequency of 5,000 mc., the modulation index B may be 64.3 and the Doppler frequency band filter 8 tuned to pass a frequency band from one (1) to one hundred fifty (150) kc.

Figure 5:
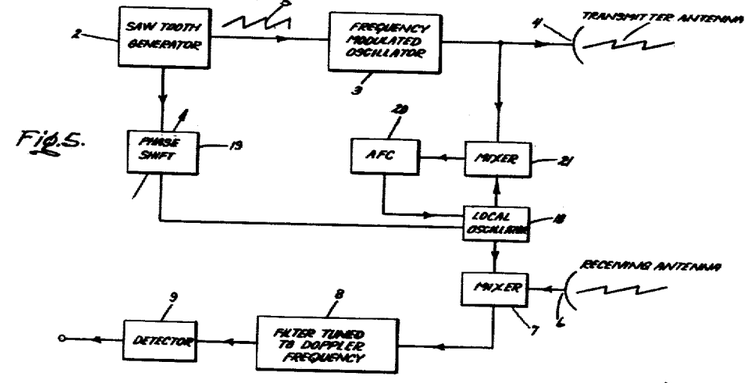
FIG. 5 is a schematic block diagram showing another embodiment of my invention.

It may be found desirable in certain instances to be able selectively to move the range response characteristic toward or away from the transmitting apparatus, as shown by the arrows 16 and 17 in FIG. 6. It will be seen that it is merely necessary to shift the time delay provided by the delay line 15 to accomplish this positioning, however, it will be readily understood that delay lines are precut to provide a particular desired time delay and thus, the arrangement of FIG. 5 to accomplish this objective is provided. Here, in which like elements are again indicated by like reference numerals, a local oscillator 18 is provided having the same carrier frequency as the frequency modulated oscillator 3. Local oscillator 18 has its output circuit connected both to mixer 7 and to a second mixer 21. Local oscillator 18 in turn is modulated by the same sawtooth waveform 5 provided by the sawtooth generator 2, the sawtooth generator 2 being connected to local oscillator 18 by means of a suitable selectively variable phase shifting or time delaying network 19, as is well known in the art. In order to be sure that the output signal provided by the local oscillator 18 is in close correspondence with that provided by the frequency modulated oscillator 3, the output circuit of local oscillator 18 is also connected to mixer 21 which in turn is connected to receive a portion of the signal transmitted by the antenna 4. The output circuit of mixer 21 then is in turn connected to a conventional automatic frequency control circuit 20 which in turn is connected to control the local oscillator 18. It will now be seen that in the circuit of FIG. 5, the received signal is mixed with a sawtooth modulated signal provided by the local oscillator 18 which corresponds to that transmitted by the transmitting antenna 4, but which is delayed therefrom by a selectively variable amount by means of the phase shifting network 19.

Figure 8:
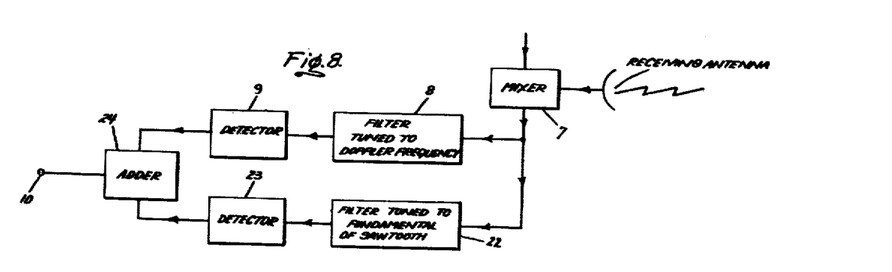
FIG. 8 is a fragmentary schematic block diagram showing another embodiment of my invention.
Figure 9:
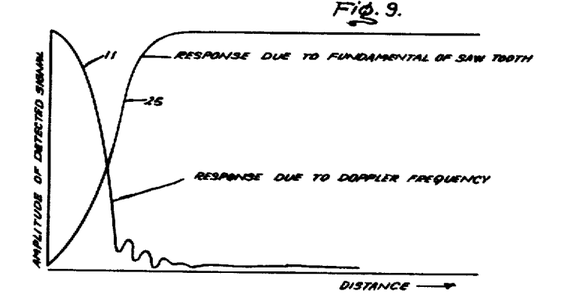
FIG. 9 is a plot showing the range response characteristic of the system of FIG. 8.

Referring now to FIGS. 8 and 9, I have found that the addition of an additional filter network tuned to pass the fundamental frequency of the sawtooth waveform 5 and higher frequencies will provide a "rejection" signal.

Thus, in addition to the filter network 8 tuned to pass the Doppler frequency band with its accompanying detector 9, as found in the previous circuits, I also provide a filter network 22 coupled to the output circuit of the mixer 7, filter 22 is a high pass filter being tuned to pass the fundamental frequency of the sawtooth waveform 5 and higher frequencies. Filter 22 is again connected to a suitable detector 23 of opposite polarity to detector 9 which in turn, along with detector 9, is connected to a conventional adding circuit 24 which has its output circuit connected to the utilization circuit 10. Reference to FIG. 9 will now show that the "acceptance" range response characteristic 11 is provided by the circuit comprising filter 8 and detector 9 whereas the "rejection" range response characteristic 25 is provided by the filter 22 and its accompanying detector 23.

Figure 10:
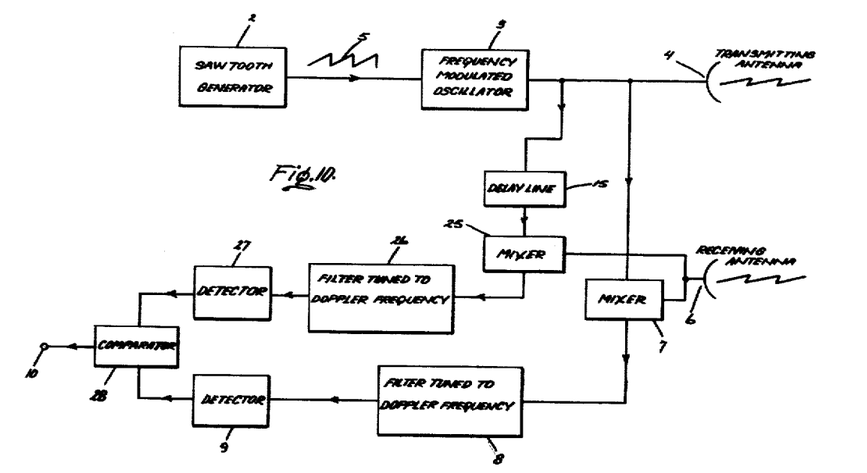
FIG. 10 is yet another schematic block diagram showing a further embodiment of my invention.
Figure 11:
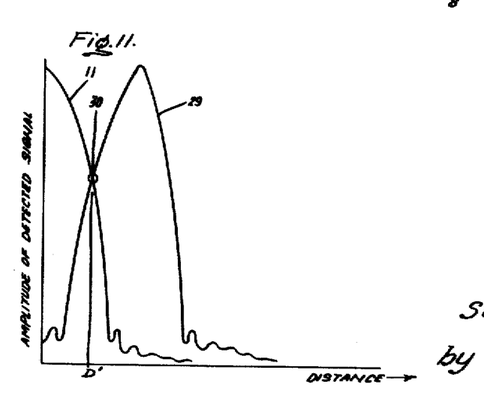
FIG. 11 is a plot showing the range response characteristic of the system of FIG. 10.

Referring now to FIGS. 10 and 11, there is shown a modified form of my improved system for providing an extremely precise range response signal. Here, in which like elements are again indicated by like reference numerals, in addition to the mixer 7, Doppler frequency band filter 8 and detector 9 of FIG. 1, another mixer 25 coupled to the receiving antenna 6 is provided, the mixer 25 also being coupled to the transmitting antenna 4 by delay line 15. The output circuit of mixer 25 is coupled to another Doppler frequency band filter 26 which in turn is coupled to a suitable detector 27. Detector 9 and detector 27 are in turn coupled to the input circuits of a conventional comparator circuit 28 which then has its output circuit coupled to the utilization circuit 10.

It will now be seen that the mixer 7, Doppler band frequency filter 8 and detector 9 correspond to the circuit of FIG. 2 whereas the delay line 15 and mixer 25, Doppler band frequency filter 26 and detector 27 correspond to the circuit of FIG. 4. The resulting signal provided by the utilization circuit 10 from the comparator 28 is shown in FIG. 11, it being understood that the mixer 7, filter 8 and detector 9 will provide the range response characteristic 11 whereas the delay line 15, mixer 25, filter 26 and detector 27 will provide the range response characteristic 29 corresponding to the range response characteristic of FIG. 6. The comparator circuit 28 therefore provides an output signal at the point where the range response characteristics 11 and 29 cross, as at 30, thus providing an extremely precise range response characteristic in the utilization circuit 10, the output signal 30 being provided only at a given target distance D' rather than over a zone of recognition as in the case of previous figures.

It will now be seen that I have provided an improved radar system employing continuous wave transmission as opposed to the prior pulse techniques employed in conventional radar equipments, my system further providing range limited operation with an extremely narrow zone of recognition, the zone of recognition being selectively positionable at any desired distance from the transmitting apparatus; it will be understood of course that the zone of recognition may be moved outwardly only until the mirror image of the $J_0$ characteristic occurs. It will also be readily comprehended that a system may be provided in which the phase shifting network 19 may be continuously varied thereby to shift the zone of recognition of FIG. 6 away and toward the transmitting apparatus to provide a scan of a given area; it will further be seen that by means of known techniques, the transmitted signal may be made to "lock onto" a particular target, this locking on being especially facilitated by means of my improved system by virtue of the extremely narrow zone of recognition provided so that signals are not being received from other unwanted targets.

While I have described above the principles of my invention in connection with specific apparatus, it is to be clearly understood that this description is made only by way of example and not as a limitation to the scope of my invention.

What is claimed is:

1. A continuous wave, narrow recognition zone radar system comprising: means for providing a signal frequency modulated by a sawtooth waveform signal; means for transmitting said frequency-modulated signal; means for receiving said frequency-modulated signal reflected from a distant object; means for mixing a signal responsive to the transmitted frequency modulated signal with the received frequency modulated signal and having output circuit means for providing an output signal resulting from said mixing; band pass filter means; and means coupling said output circuit means to said band pass filter means for coupling said output signal thereto; said band pass filter means being tuned to pass only the Doppler frequency band contained in said output signal.

2. A continuous wave, narrow recognition zone radar system comprising: means for providing a signal frequency modulated by a sawtooth waveform signal; means for transmitting said frequency-modulated signal; means for receiving said frequency-modulated signal reflected from a distant object; means for mixing a signal responsive to the transmitted frequency modulated signal with the received frequency modulated signal and having output circuit means for providing an output signal resulting from said mixing; band pass filter means; means coupling said output circuit means to said band pass filter means for coupling said output signal thereto; said band pass filter means being tuned to pass only the Doppler frequency band contained in the output signal from said comparing means; and detector means coupled to said band pass filter means.

3. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; means for mixing the received frequency modulated signal and a signal responsive to the transmitted frequency modulated signal and having output circuit means for providing an output signal resulting from said mixing; a band pass filter; means coupling said output circuit means to said band pass filter for coupling said output signal thereto; said band pass filter being tuned to pass only the Doppler frequency band contained in the output signal from said mixing means; and detector means coupled to said band pass filter.

4. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; means for mixing the received frequency modulated signal and a signal responsive to the transmitted frequency modulated signal and having output circuit means for providing an output signal resulting from said mixing; a band pass filter; means coupling said output circuit means to said band pass filter for coupling said output signal thereto; said band pass filter being tuned to pass only the Doppler frequency band contained in the output signal from said mixing means; and detector means coupled to said band pass filter; said source of sawtooth waveform signals being arranged so that the fundamental frequency of said sawtooth waveform signals is above the highest frequency in said Doppler frequency band.

5. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; means for mixing the received frequency modulated signal and a signal responsive to the transmitted frequency modulated signal having output circuit means for providing an output signal resulting from said mixing; a band pass filter; means coupling said output circuit means to said band pass filter for coupling said output signal thereto; and detector means coupled to said band pass filter; said band pass filter being tuned to pass only the Doppler frequency band contained in the output signal from said mixing means so that the output signal of said detector means is $$e_d = b J_0(M)^x \cos \frac{wD}{C}$$

where:
$e_d$ = the output signal from said detector means
$b$ = a summation of the gains and losses in the system
$J_0$ = the Bessel function of the first kind, 0 order and argument M $$M = 2B \sin \frac{\mu D}{C}$$

$B$ is the modulation index of said transmitted frequency modulated signal
$x$ is the number of effective side bands in said transmitted frequency modulated signal $\cos \frac{wD}{C}$ = Doppler frequency $w = 2\pi f_c$ (carrier frequency)
$\mu = 2\pi f_m$ (modulation frequency)
$D$ = distance to said distant object
$C$ = velocity of propagation 6. A continuous wave, narrow recognition zone radar system comprising: means for providing a signal frequency modulated by a sawtooth waveform signal; means for transmitting said frequency-modulated signal; means for receiving said frequency-modulated signal reflected from a distant object; means for comparing the transmitted and received frequency modulated signals and having output circuit means providing an output signal resulting from said comparison; band pass filter means; and means coupling said output circuit to said band pass filter means for coupling said output signal thereto; said band pass filter means being tuned to pass only the Doppler frequency band contained in said output signal.

7. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; means for mixing the received frequency modulated signal and a portion of the transmitted frequency modulated signal and having output circuit means for providing an output signal resulting from said mixing; a band pass filter; means coupling said output circuit means to said band pass filter for coupling said output signal thereto; said band pass filter being tuned to pass only the Doppler frequency band contained in the output signal from said mixing means; and detector means coupled to said band pass filter.

8. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; mixing means coupled to said transmitting means and to said receiving means for mixing the received frequency modulated signal and a portion of the transmitted frequency modulated signal and having output circuit means for providing an output signal resulting from said mixing; a band pass filter; means coupling said output circuit means to said band pass filter for coupling said output signal thereto; and detector means coupled to said band pass filter; said band pass filter being tuned to pass only the Doppler frequency band contained in the output signal from said mixing means so that the output of said detector means is $$e_d = b J_0(M)^x \cos \frac{wD}{C}$$

where:
$e_d$=the output signal from said detector means
$b$=a summation of the gains and losses in the system
$J_0$=the Bessel function of the first kind, 0 order and argument M $$M = 2B \sin \frac{\mu D}{C}$$

B is the modulation index of said transmitted frequency modulated signal
x is the number of effective side bands in said transmitted frequency modulated signal $\cos \frac{wD}{C}$=Doppler frequency $w = 2\pi f_c$ (carrier frequency)
$\mu = 2\pi f_m$ (modulation frequency)
$D$=distance to said distant object
$C$=velocity of propagation 9. A continuous wave, narrow recognition zone radar system comprising: means for providing a signal frequency modulated by a sawtooth waveform signal; means for transmitting said frequency-modulated signal; means for receiving said frequency-modulated signal reflected from a distant object; means for mixing the received frequency modulated signal with a signal responsive to the transmitted frequency modulated signal but having a predetermined time delay with respect thereto; and band pass filter means coupled to said mixing means and tuned to pass only the Doppler frequency band contained in the output signal therefrom.

10. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; means for mixing the received frequency modulated signal and a signal responsive to the transmitted frequency-modulated signal but having a predetermined time delay with respect thereto; a band pass filter coupled to the output circuit of said mixing means and tuned to pass only the Doppler frequency band contained in the output signal from said mixing means; and detector means coupled to said band pass filter.

11. A continuous wave, narrow recognition zone radar system comprising: a source of sawtooth waveform signals; means for frequency modulating a carrier frequency with said sawtooth waveform signal; means for transmitting the frequency-modulated signal provided by said frequency modulating means; means for receiving said frequency-modulated signal reflected from a distant object; mixing means coupled to said receiving means; means including time delay means coupled to said mixing means for supplying a signal thereto responsive to the transmitted frequency modulated signal but having a predetermined time delay with respect thereto; a band pass filter coupled to the output circuit of said mixing means; and detector means coupled to said band pass filter; said band pass filter being tuned to pass the Doppler frequency band contained in the output signal from said mixing means so that the output of said detector means is $$e_d = b J_0(M)^x \cos \frac{wD}{C}$$

where:
$e_d$=the output signal from said detector means
$b$=a summation of the gains and losses in the system
$J_0$=the Bessel function of the first kind, 0 order and argument M $$M = 2B \sin \frac{\mu D}{C}$$

B is the modulation index of said transmitted frequency modulated signal
x is the number of effective side bands in said transmitted frequency modulated signal $\cos \frac{wD}{C}$=Doppler frequency $w = 2\pi f_c$ (carrier frequency)
$\mu = 2\pi f_m$ (modulation frequency)
$D$=distance to said distant object
$C$=velocity of propagation 12. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; mixing means coupled to said receiving means and to said transmitting means by delay line means for mixing the received frequency modulated signal and a portion of the transmitted frequency modulated signal having a predetermined time delay; a band pass filter coupled to the output circuit of said mixing means and tuned to pass only the Doppler frequency band contained in the output signal from said mixing means; and detector means coupled to said band pass filter.

13. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; mixing means coupled to said receiving means; a delay line coupling said transmitting means to said mixing means for supplying a portion of the transmitted frequency modulated signal thereto with a predetermined time delay; a band pass filter coupled to the output circuit of said mixing means; and detector means coupled to said band pass filter; said band pass filter being tuned to pass only the Doppler frequency band contained in the output signal from said mixing means so that the output of said detector means is $$e_d = b J_0(M)^x \cos \frac{wD}{C}$$

where:
$e_d$=the output signal from said detector means
$b$=a summation of the gains and losses in the system
$J_0$=the Bessel function of the first kind, 0 order and argument M $$M = 2B \sin \frac{\mu D}{C}$$

B is the modulation index of said transmitted frequency modulated signal
x is the number of effective side bands in said transmitted frequency modulated signal $\cos \frac{wD}{C}$=Doppler frequency $w = 2\pi f_c$ (carrier frequency)
$\mu = 2\pi f_m$ (modulation frequency)
$D$=distance to said distant object
$C$=velocity of propagation 14. A continuous wave, narrow recognition zone radar system comprising: a source of sawtooth waveform signals; means for frequency modulating a carrier frequency with said sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; mixing means coupled to said receiving means; local oscillator means having its output circuit coupled to said mixing means and having the same carrier frequency as said frequency modulating means; time delay means coupled between said sawtooth waveform signal source and said local oscillator means for frequency modulating said local oscillator with said sawtooth waveform signal with a predetermined time delay; a tuned circuit coupled to the output circuit of said mixing means and tuned to pass the Doppler frequency band contained in the output signal from said mixing means; and detector means coupled to said tuned circuit.

15. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; first mixing means coupled to said receiving means; local oscillator means having its output circuit coupled to said mixing means and having the same carrier frequency as said frequency modulating means; selecitvely variable time delay means coupled between said sawtooth waveform signal source and said local oscillator means for frequency modulating the same with said sawtooth waveform signal with a selectively variable time delay; second mixing means coupled to said local oscillator output circuit and said transmitting means and having its output circuit connected to the input circuit of automatic frequency control means; said automatic frequency control means having its output circuit coupled to said local oscillator means whereby said local oscillator means supplies to said first mixing means a signal frequency modulated with said sawtooth waveform signal and substantially corresponding to the transmitted signal but with a selectively variable time delay with respect thereto; a tuned circuit coupled to the output circuit of said mixing means; and detector means coupled to said tuned circuit; said tuned circuit being tuned to pass the Doppler frequency band contained in the output signal from said mixing means so that the output of said detector means is $$e_d = bJ_0(M)^x \cos \frac{wD}{C}$$

where:
$e_d$ = the output signal from said detector means
$b$ = a summation of the gains and losses in the system
$J_0$ = the Bessel function of the first kind, 0 order and argument M $$M = 2B \sin \frac{\mu D}{C}$$

B is the modulation index of said transmitted frequency modulated signal
$x$ is the number of effective side bands in said transmitted frequency modulated signal $\cos \frac{wD}{C}$ = Doppler frequency $w = 2\pi_c$ (carrier frequency)
$\mu = 2\pi f_m$ (modulation frequency)
$D$ = distance to said distant object
$C$ = velocity of propagation.

16. A continuous wave, narrow recognition zone radar system comprising: means for providing a signal frequency modulated by a sawtooth waveform signal; means for transmitting said frequency-modulated signal; means for receiving said frequency-modulated signal reflected from a distant object; means for mixing a signal responsive to the transmitted signal with the received signal; first detector means having its input circuit coupled to the output circuit of said mixing means by first tuned circuit means, said first tuned circuit means being tuned to pass the Doppler frequency band contained in the output signal from said mixing means; and second detector means having its input circuit coupled to the output circuit of said mixing means by second tuned circuit means, said second tuned circuit means being tuned to pass at least the fundamental frequency of said sawtooth waveform signal.

17. A continuous wave, narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; means for mixing the received signal and a signal responsive to the transmitted signal; a first tuned circuit coupled to the output circuit of said mixing means and tuned to pass the Doppler frequency band contained in the output signal from said mixing means; first detector means coupled to said first tuned circuit; a second tuned circuit coupled to the output circuit of said mixing means and tuned to pass the fundamental frequency of said sawtooth waveform signal and higher frequencies; and second detector means coupled to said second tuned circuit.

18. A continuous wave narrow recognition zone radar system comprising: a source of sawtooth waveform signals; means for frequency modulating a carrier frequency with said sawtooth waveform signals; means for transmitting the frequency-modulated signal provided by said frequency modulating means; means for receiving said frequency-modulated signal reflected from a distant object; first means coupled to said receiving and transmitting means for mixing the received signal and a portion of the transmitted signal; a first tuned circuit coupled to the output circuit of said first mixing means and tuned to pass the Doppler frequency band contained in the output signal from said first mixing means; first detector means coupled to said first tuned circuit; second means coupled to said receiving means and to said transmitting means by delay line means for mixing the received signal and a portion of the transmitted signal with a predetermined time delay; a second tuned circuit coupled to the output circuit of said second mixing means and tuned to pass the Doppler frequency band contained in the output signal from said second mixing means; second detector means coupled to said second tuned circuit; and comparator means coupled to said first and second detector means.

19. The method of obtaining radar range discrimination in a continuous wave radar system comprising the steps of: frequency modulating a carrier frequency with a sawtooth wave form signal; transmitting the resultant frequency modulated signal; receiving said frequency modulated signal reflected from a distant object; mixing a signal responsive to the transmitted frequency modulated signal and the reflected frequency modulated signal; and filtering the signal resulting from said mixing to pass only the Doppler signal band contained therein.

20. The method of obtaining radar range discrimination in a continuous wave radar system comprising the steps of: generating a saw-tooth wave form signal; frequency modulating a carrier frequency with said saw tooth wave form signal; transmitting the resulting frequency modulated signal; receiving said frequency modulated signal reflected from a distant object; mixing the reflected frequency modulated signal and a signal responsive to the transmitted frequency modulated signal; filtering the signal resulting from said mixing to pass only the Doppler signal band contained therein; and detecting the filtered signal.

21. The method of obtaining radar range discrimination in a continuous wave radar system comprising the steps of: generating a saw tooth wave form signal; frequency modulating a carrier frequency with said saw tooth wave form signal; transmitting the resulting frequency modulated signal; receiving said frequency modulated signal reflected from a distant object; mixing the reflected frequency modulated signal and a portion of the transmitted frequency modulated signal; filtering the signal resulting from said mixing to pass only the Doppler signal band contained therein; and detecting the filtered signal.

22. The method of obtaining radar range discrimination in a continuous wave radar system comprising the steps of: generating a saw tooth wave form signal; frequency modulating a carrier frequency with said saw tooth wave form signal; transmitting the resulting frequency modulated signal; receiving said frequency modulated signal reflected from a distant object; providing a frequency modulated signal responsive to the transmitted frequency modulated signal and delaying the same with respect to said transmitted frequency modulated signal; mixing the reflected frequency modulated signal and said delayed frequency modulated signal; filtering the signal resulting from said mixing to pass only the Doppler signal band contained therein; and detecting the filtered signal.

23. The method of obtaining radar range discrimination in a continuous wave radar system comprising the steps of: generating a saw tooth wave form signal; frequency modulating a carrier frequency with said saw tooth wave form signal; transmitting the resulting frequency modulated signal; receiving said frequency modulated signal reflected from a distant object; delaying a portion of the transmitted frequency modulated signal by a predetermined amount; mixing the reflected frequency modulated signal and said delayed frequency modulated signal; filtering the signal resulting from said mixing to pass only the Doppler signal band contained therein; and detecting the filtered signal.

24. The method of obtaining radar range discrimination in a continuous wave radar system comprising the steps of: generating a saw tooth wave form signal; frequency modulating a carrier frequency with said saw tooth wave form signal; transmitting the resulting frequency modulated signal; receiving said frequency modulated signal reflected from a distant object; generating a local signal having a frequency identical to the carrier frequency of said transmitted frequency modulated signal; delaying a portion of said saw tooth wave form signal frequency modulating said local signal with said delayed signal to provide a local frequency modulated signal identical to said transmitted frequency modulated signal but delayed with respect thereto; mixing the reflected frequency modulated signal and said local frequency modulated signal; filtering the signal resulting from said mixing to pass only the Doppler frequency signal band contained therein; and detecting the filtered signal.

25. The method of obtaining radar range discrimination in a continuous wave radar system comprising the steps of: generating a saw tooth wave form signal; frequency modulating a carrier frequency with said saw tooth wave form signal; transmitting the resulting frequency modulated signal; receiving said frequency modulated signal reflected from a distant object; mixing the reflected frequency modulated signal and a signal responsive to the transmitted frequency modulated signal; filtering the signal resulting from said mixing to pass only the Doppler signal band contained therein; filtering the signal resulting from said mixing to pass only the fundamental frequency of said saw tooth signal and higher frequencies; and adding the thus filtered signals.

References Cited in the file of this patent

UNITED STATES PATENTS

| 2,451,822 | Guanella | Oct. 19, 1948 |
| 2,453,169 | Varian | Nov. 9, 1948 |
| 2,528,119 | Crosby | Oct. 31, 1950 |
| 2,769,158 | Schultz | Oct. 30, 1956 |
| 2,842,764 | Harvey | July 8, 1958 |
| 2,958,862 | Rey | Nov. 1, 1960 |

FOREIGN PATENTS

| 671,461 | Great Britain | May 7, 1952 |

OTHER REFERENCES

Luck: Frequency Modulated Radar, pp. 6–10, McGraw-Hill, New York, 1949.

UNITED STATES PATENT OFFICE
CERTIFICATE OF CORRECTION

Patent No. 3,108,273                      October 22, 1963

Stephen J. Erst

It is hereby certified that error appears in the above numbered patent requiring correction and that the said Letters Patent should read as corrected below.

Column 9, line 15, for "M-2B $\sin \frac{\mu D}{C}$" read -- M=2B $\sin \frac{\mu D}{C}$ --; column 11, line 68, for "w=$2\pi_c$ (carrier frequency)" read -- w=$2\pi f_c$ (carrier frequency) --.

Signed and sealed this 19th day of May 1964.

(SEAL)
Attest:

ERNEST W. SWIDER                                  EDWARD J. BRENNER
Attesting Officer                                        Commissioner of Patents